United States Patent [19]

Landry et al.

[11] Patent Number: 5,247,685
[45] Date of Patent: Sep. 21, 1993

[54] INTERRUPT HANDLING IN AN ASYMMETRIC MULTIPROCESSOR COMPUTER SYSTEM

[75] Inventors: John A. Landry, Tomball; Paul R. Culley, Cypress, both of Tex.

[73] Assignee: Compaq Computer Corp., Houston, Tex.

[21] Appl. No.: 996,526

[22] Filed: Dec. 23, 1992

Related U.S. Application Data

[63] Continuation of Ser. No. 431,658, Nov. 3, 1989, abandoned.

[51] Int. Cl.[5] .................. G06F 13/24; G06F 13/14; G06F 15/16
[52] U.S. Cl. .................. 395/725; 364/228; 364/242.2; 364/240; 364/240.1; 364/241.2; 364/241.6; 364/DIG. 1
[58] Field of Search .............. 395/725, 325, 275, 200, 395/800, 775; 370/85.2; 340/825.06

[56] References Cited

U.S. PATENT DOCUMENTS

| | | | |
|---|---|---|---|
| 4,271,468 | 6/1981 | Christensen | 364/200 |
| 4,417,302 | 11/1983 | Chimienti | 364/200 |
| 4,504,906 | 3/1985 | Itaya et al. | 364/200 |
| 4,644,465 | 2/1987 | Imamura et al. | 364/200 |
| 4,953,072 | 8/1990 | Williams | 364/200 |

FOREIGN PATENT DOCUMENTS 0125797 11/1984 European Pat. Off. .
0192944 9/1986 European Pat. Off. .

*Primary Examiner*—Michael R. Fleming
*Assistant Examiner*—Gopal C. Ray
*Attorney, Agent, or Firm*—Pravel, Hewitt, Kimball & Krieger

[57] ABSTRACT

Two independently operating microprocessors share common control, data and address buses. A first of the microprocessors is assigned, when it is on the buses, to respond to all maskable interrupts by causing placement of an interrupt vector on the bus at the start of the next bus cycle. When the second microprocessor is on the buses and a maskable interrupt is received, the start of the next bus cycle is inhibited from causing an interrupt vector to be placed on the bus.

6 Claims, 7 Drawing Sheets

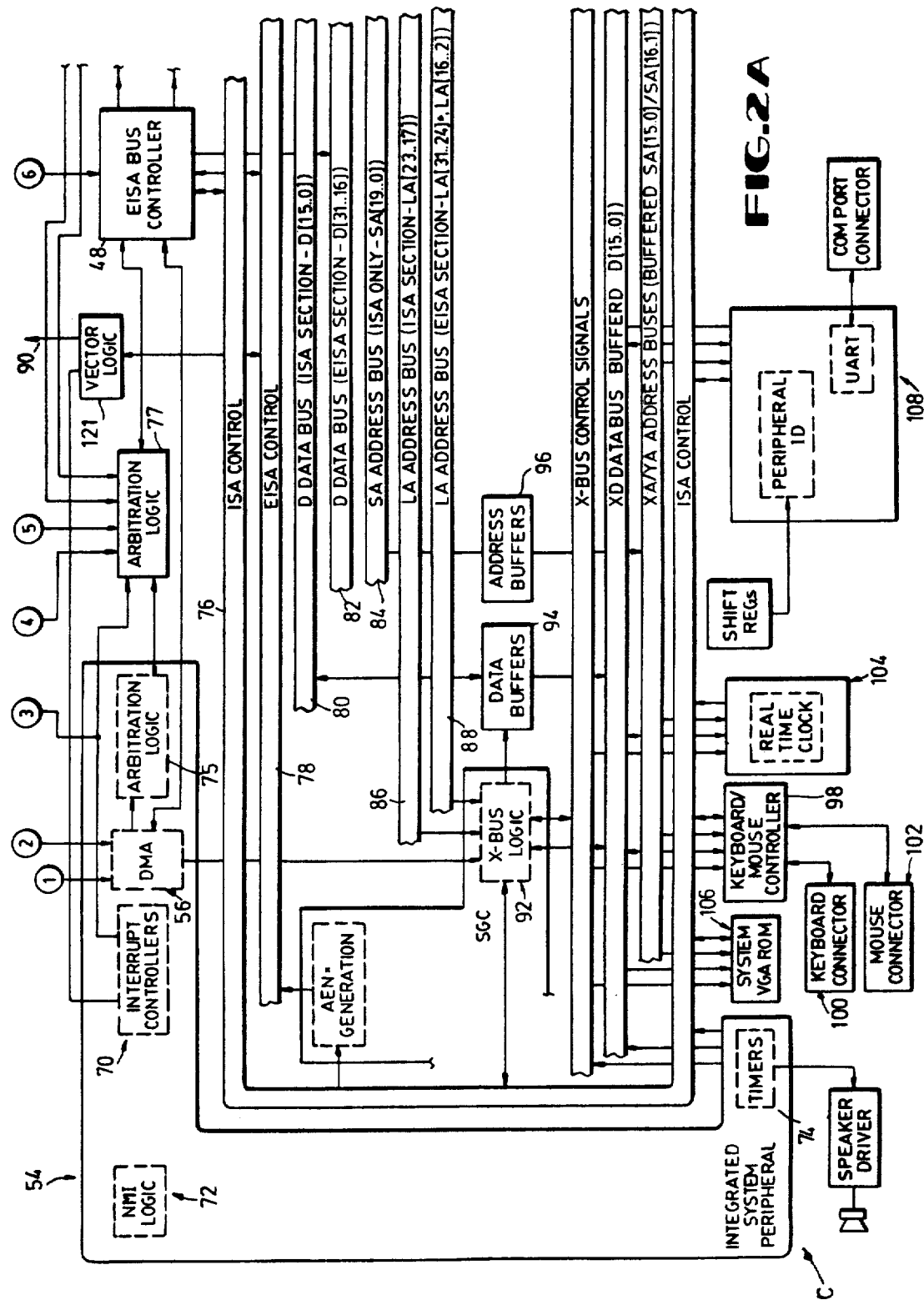

INTERRUPT HANDLING IN AN ASYMMETRIC MULTIPROCESSOR COMPUTER SYSTEM

This is a continuation of co-pending application Ser. No. 431,658, filed on Nov. 3, 1989, now abandoned.

BACKGROUND OF INVENTION

1. Field of the Invention

The present invention relates to digital computers with two microprocessors operating off of shared control, data and address buses.

2. Description of Prior Art

It has become desirable for operating speed and reduced computer time to have two microprocessors operate independently from each other while sharing common control, data and address buses. For simplicity of design, programming and manufacture, the microprocessors should have identical configurations. It is necessary for the microprocessors to be able to respond to various external hardware events. For this purpose, microprocessors are provided with an interrupt function. With two such microprocessors sharing common buses, however, problems have arisen concerning response to interrupt signals. For example, one microprocessor might erroneously respond to an interrupt signal and search for an interrupt vector actually intended for the other microprocessor.

SUMMARY OF INVENTION:

Briefly, the present invention provides a new and improved multiprocessor interrupt control apparatus for two processors. The processors share common control, data and address buses while operating independently on them. The processors further preferably operate as a part of a computer system using the extended industry standard architecture (EISA) bus.

A first of the two processors responds to a maskable interrupt received from a programmable register which is addressable by both processors, or a numeric coprocessor extension and/or a numeric coprocessor, both associated with the first processor. On receipt of a maskable interrupt, processor control logic for the first processor forms an interrupt signal which is furnished to an integrated system peripheral which forms a processor interrupt signal. The first processor in response performs an interrupt acknowledge cycle to receive an interrupt vector.

The second processor responds to maskable interrupts from a programmable register, a coprocessor extension and/or a numeric coprocessor associated with the second processor. However, in response to a maskable interrupt, processor control logic for the second processor forms an interrupt signal which is furnished only to the second processor interrupt input.

Vector replacement logic circuitry responds to maskable interrupts and determines which of the two processors is on the bus at that time. In the event the first processor is on the bus, vector replacement logic allows the integrated system peripheral to provide the interrupt vector read by the first processor. When, however, the second processor is on the bus at the time a maskable interrupt is received, the vector replacement logic circuitry inhibits the start of the next bus cycle of the integrated system peripheral. This prevents, an interrupt vector from being placed on the bus by the integrated system peripheral when the second processor is on the bus. The vector replacement logic circuitry instead provides the interrupt vector in this instance.

DESCRIPTION OF PREFERRED EMBODIMENT

Figure 1A:
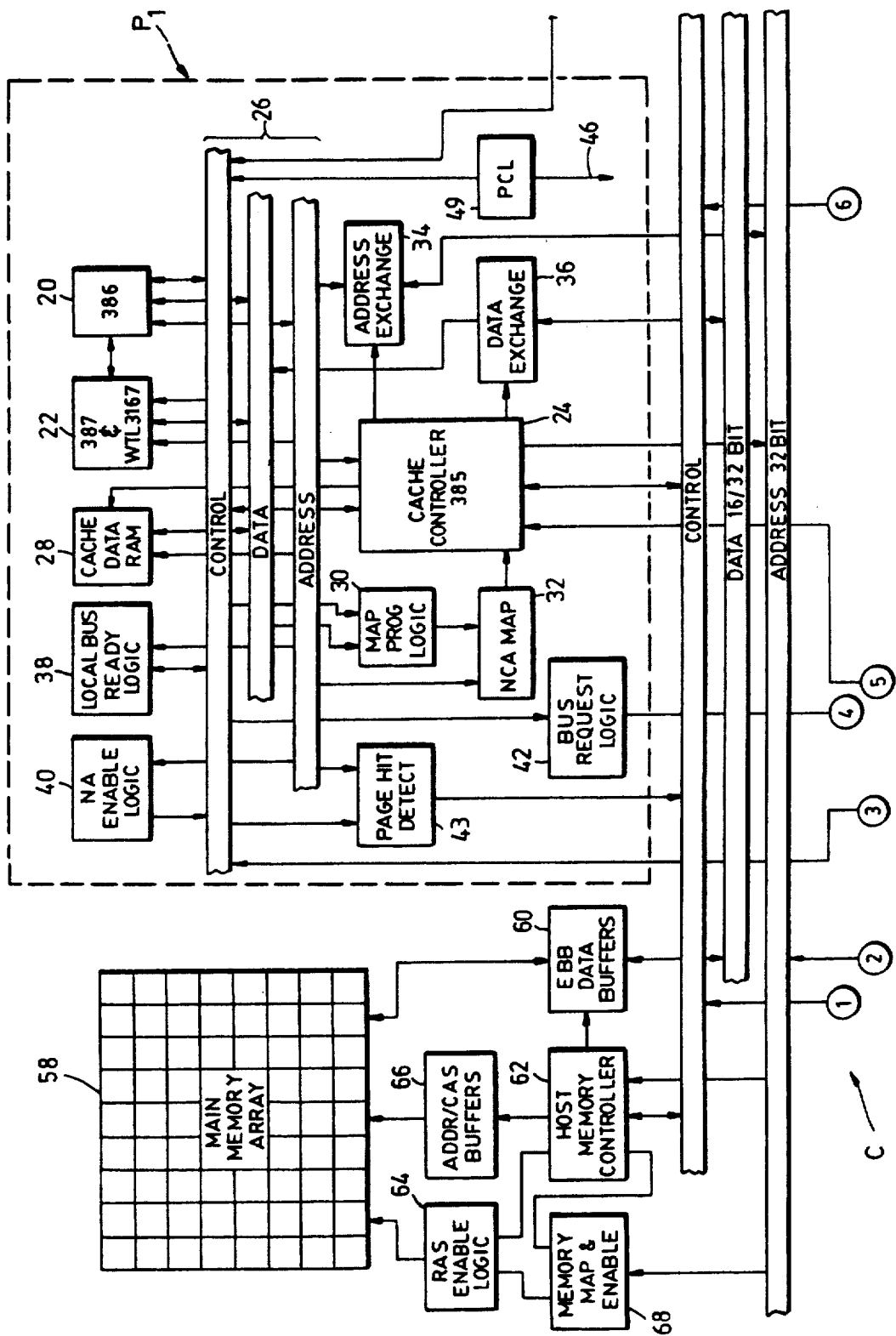
FIGS. 1 and 2, taken together, are a schematic circuit diagram of a computer according to the present invention.
Figure 1B:
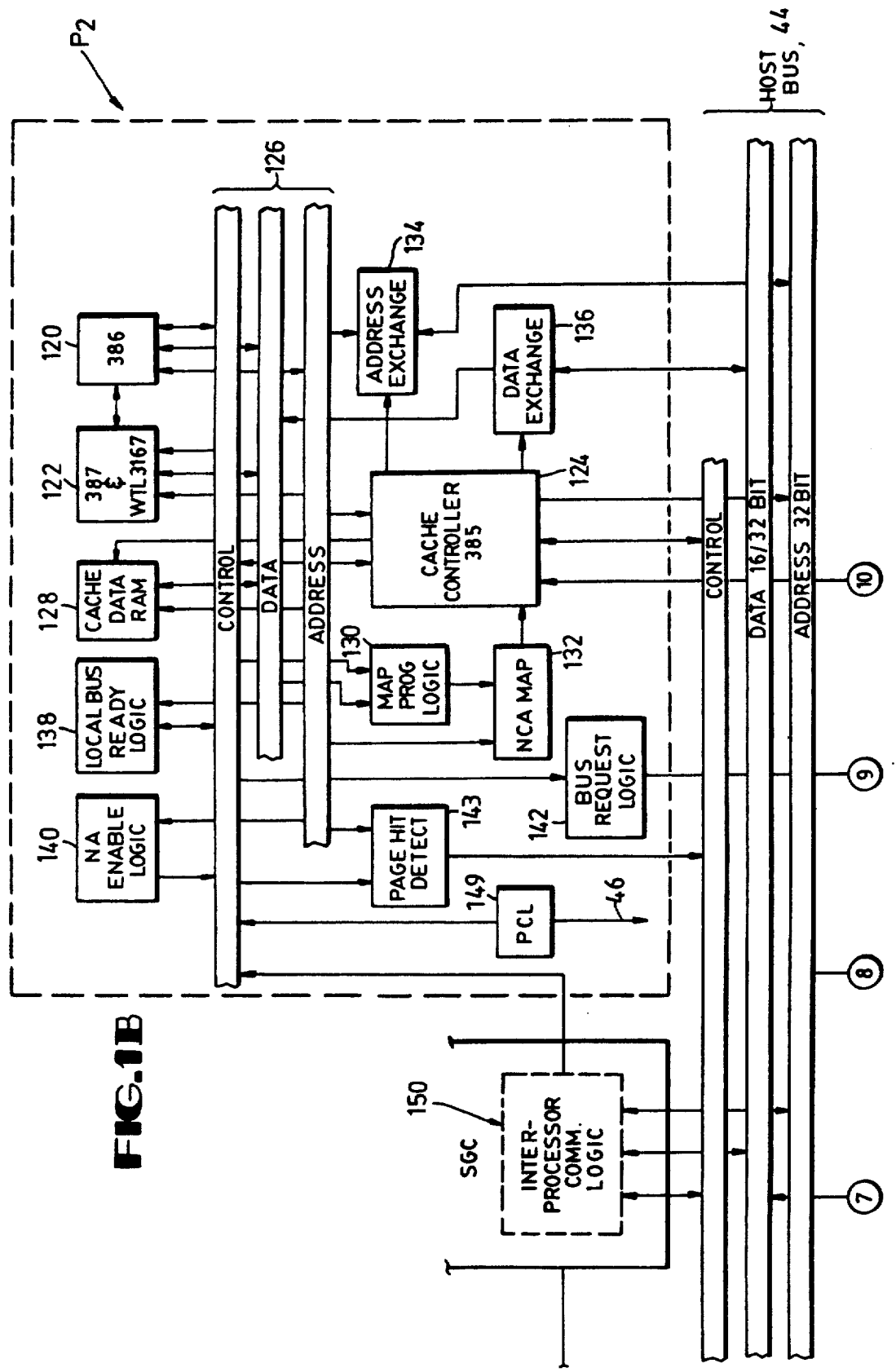
Figure 2B:
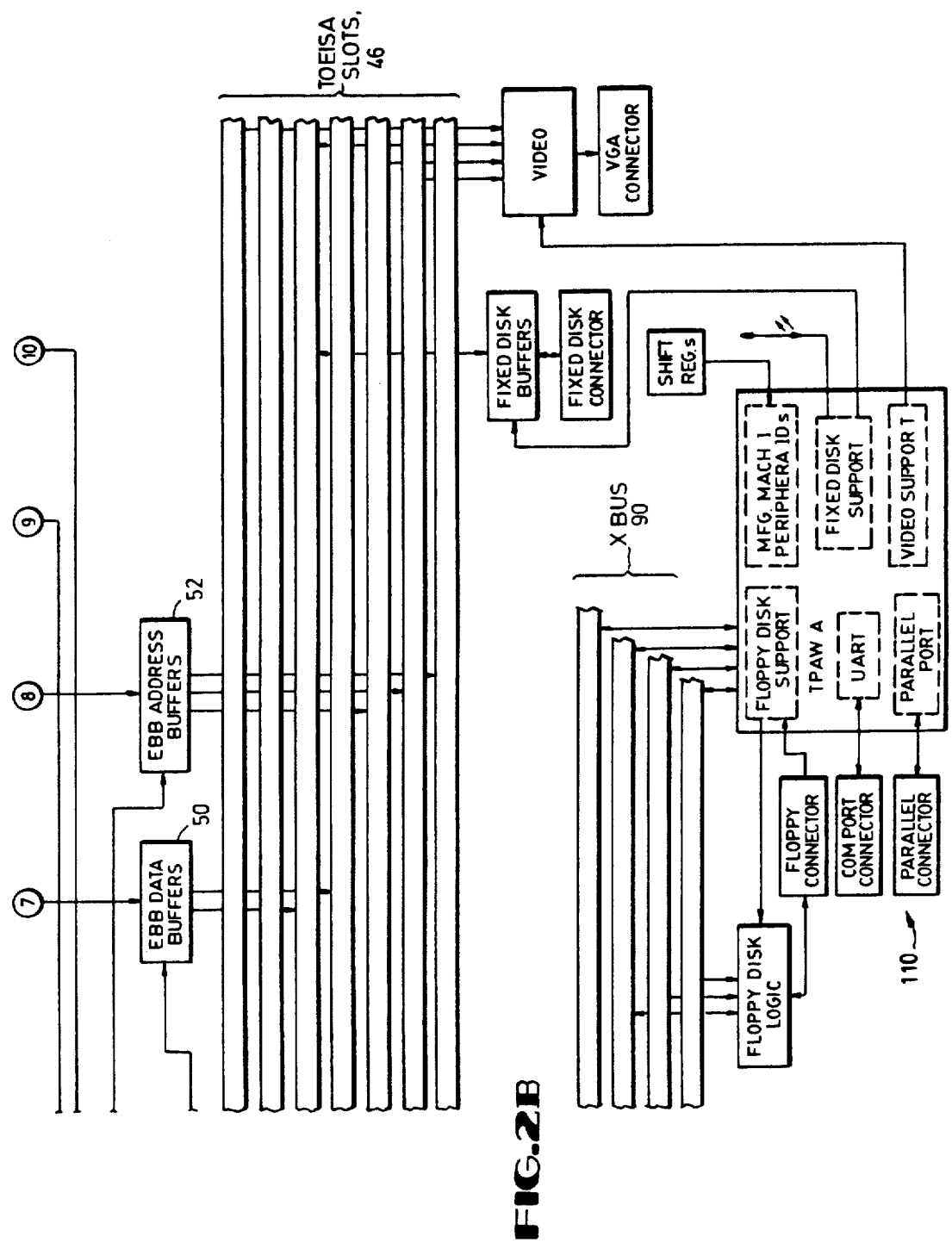

Referring now to FIGS. 1 and 2, the letter C designates generally a computer system incorporating the present invention. For clarity, system C is shown in two portions, with the interconnections between FIGS. 1 and 2 designated by reference to the circled numbers one to ten. System C is comprised of a number of block elements interconnected via a plurality of buses. Throughout this specification, signal mnemonics with an asterisk following the signal descriptors indicate the signal is active at a logic low level. Signal mnemonics having numbers or ranges between angled brackets refer to those particular bits or positions in a bus.

In FIG. 1, a computer system is depicted. A processing unit Pl comprises a processor 20, a numerical coprocessor 22 and a cache memory controller 24 and associated logic circuits connected to a local processor bus 26. Associated with cache controller 24 are high speed cache data random access memory 28, noncacheable memory address map programming logic circuitry 30, noncacheable address memory 32, address exchange latch circuitry 34 and data exchange transceiver 36. Associated with the processor unit Pl also are local bus ready logic circuit 38, next address enable logic circuit 40 and bus request logic circuit 42.

The processor 20 is preferably an Intel 80386 microprocessor. The processor 20 has its control, address and data lines interfaced to the local processor bus 26. The coprocessor 22 is preferably an Intel 80387 and/or Weitek WTL 3167 numeric coprocessor interfacing with the local processor bus 26 and the processor 20 in the conventional manner. The cache ram 28 is preferably a suitable high-speed static random access memory which interfaces with the address and data elements of bus 26 under control of the cache controller 24 to carry out required cache memory operations. The cache controller 24 is preferably an Intel 82385 cache controller configured to operate in two-way set associative master mode. In the preferred embodiment the components are the 33 MHz versions of the respective units. Address latch circuitry 34 and data transceiver 36 interface the cache controller 24 with the processor 20 and provide a local bus interface between the local processor bus 26 and a host bus 44, according to conventional practice in an 80386 and 82385 based system.

Circuit 38 is a logic circuit which provides a bus ready signal to control access to the local bus 26 and indicate when the next cycle can begin. The enable circuit 40 is utilized to indicate that the next address of data or code to be utilized by subsystem elements in pipelined address mode can be placed on the local bus 26.

Noncacheable memory address map programmer 30 cooperates with the processor 20 and the noncacheable address memory 32 to map noncacheable memory locations. The noncacheable address memory 32 is utilized to designate areas of system memory that are noncacheable to avoid many types of cache memory incoherency. The bus request logic circuit 42 is utilized by the processor 20 and associated elements to request access to the host bus 44 in situations such as when requested data is not located in the cache memory 28 and access to system memory is required. A page hit detector 43 is connected to the local processor bus 26 to allow the earliest possible determination of whether a cache miss cycle will be a memory page hit.

In the drawings, system C is configured having the processor bus 26, the host bus 44, an extended industry standard architecture (EISA) bus 46 (FIG. 2) and an X bus 90. The details of the portion of the system illustrated in FIG. 2, and not discussed in detail below are not significant to the present invention other than to illustrate an example of a fully configured computer system. The EISA specification Version 3.1 is provided in U.S. Pat. No. 5,101,492 entitled "Data Redundancy and Recovery Protection" by Schultz, et al., which fully explains the requirements of an EISA system and is hereby incorporated by reference. The portion of system C illustrated in FIG. 2 is essentially a configured EISA system which includes the necessary EISA bus 46, an EISA bus controller 48, data latches and transceivers 50 and address latches and buffers 52 to interface between the EISA bus 46 and the host bus 44. Also illustrated in FIG. 2 is an integrated system peripheral 54, which incorporates a number of the elements used in an EISA-based computer system.

The integrated system peripheral (ISP) 54 includes a direct memory access controller 56 for controlling access to main memory 58 (FIG. 1), or memory contained in EISA slots and input/output (I/O) locations, without the need for access to the processor 20. The main memory array 58 is considered to be local memory and comprises a memory circuit array of size suitable to accommodate the particular requirements of the system. The ISP 54 also includes interrupt controllers 70, nonmaskable interrupt logic 72 and system timers 74 which allow control of interrupt signals and generate necessary timing signals and wait states in a manner according to the EISA specification and conventional practice. In the preferred embodiment, processor generated interrupt requests are controlled via dual interrupt control circuits emulating and extending conventional Intel 8259 interrupt controllers. The ISP 54 also includes bus arbitration logic 75 which, in cooperation with the bus controller 48 and overall arbitration logic 77, controls and arbitrates among the various requests for the EISA bus 46 by the cache controller 24, the DMA controller 56 and bus master devices located on the EISA bus 46.

The main memory array 58 (FIG. 1) is preferably page mode dynamic random access memory. Memory 58 interfaces with the host bus 44 via a data buffer circuit 60, a memory controller circuit 62 and a memory mapping and enable circuitry 68. The buffer 60 performs data transceiving and parity generating and checking functions. The memory controller 62 and the memory mapping circuitry 68 interface with the memory 58 via address multiplexer and column address strobe buffers 66 and row address enable logic circuit 64. The memory controller 62 also receives a signal from the page hit detector 43 to control operation.

The EISA bus 46 (FIG. 2) includes ISA and EISA control buses 76 and 78, ISA and EISA data buses 80 and 82 and address buses 84, 86 and 88. System peripherals are interfaced via the X bus 90 in combination with the ISA control bus 76 from the EISA bus 46. Control and data/address transfer for the X bus 90 are facilitated by X bus control logic 92, data transceivers 94 and address latches 96.

Attached to the X bus 90 are various peripheral devices such as keyboard/mouse controller 98 which interfaces the X bus 90 with a suitable keyboard and mouse via connectors 100 and 102, respectively. Also attached to the X bus 90 are read only memory circuits 106 which contain basic operations software for the system C and for system video operations. A serial communications port 108 is also connected to the system C via the X bus 90. Floppy and fixed disk support, a parallel port, a second serial port, and video support circuits are provided in block circuit 110.

In the preferred embodiment, two similar processor units P1 and P2 are located on the host bus 44. Processor unit P2 is similar to processor unit P1, with like circuits having the same reference number plus 100. The overall arbitration logic 77 is adapted for use with the two processor units P1 and P2 and arbitrates between the two processor units P1 and P2 to share the CPU arbitration location provided in the EISA specification. To allow interaction between the two processor units P1 and P2, process control logic circuits 49 and 149 are connected to the host bus 44, to their respective processor units P1 and P2, and to each other.

In general in this specification, a signal name having a first letter of P refers to a signal generally on the local bus 26, with a signal having a first letter of H represents that version of the signal generally on the host bus 44 and a signal having a first letter of M generally represents the version of that signal relating to the memory interface.

As will be set forth below, processor control logic circuit 49 responds to a maskable interrupt signal from any of: a programmable register contained in the processor control logic circuit 49 and addressable by processors P1 or P2; the Weitek WTL3167 portion of numeric coprocessor 22; or the Intel 80387 portion of numeric coprocessor 22. Processor control logic circuit 49 as its response forms an IRQ13 interrupt signal which is furnished to the integrated system peripheral 54. Integrated system peripheral 54 in response forms a processor interrupt signal which is furnished to the interrupt input of processor 20. Processor 20 in response performs an interrupt acknowledge cycle to receive an interrupt vector.

A vector replacement logic circuit 121 is provided and is connected to host bus 44. As will be set forth below, vector replacement logic circuit 121 responds to a maskable interrupt and determines which of processor 20 or processor 120 is currently on the host bus 44. In the event that processor 20 is detected to be operating on the bus 44, vector replacement logic circuit 121 allows the integrated system peripheral 54 to provide the interrupt vector read by the processor 20. In the alternative occurrence, namely that processor 120 is detected to be operating on the host bus 44, vector replacement logic circuit 121 inhibits the start of the next bus cycle to the integrated system peripheral 54, instead of passing a signal which is furnished by EISA bus controller 48. This prevents an interrupt vector from being placed on the bus 44 by the integrated system peripheral 54 when the processor 120 is on the host bus 44. Instead, the vector replacement logic circuit 121 provides the interrupt vector in this instance.

Figure 4:
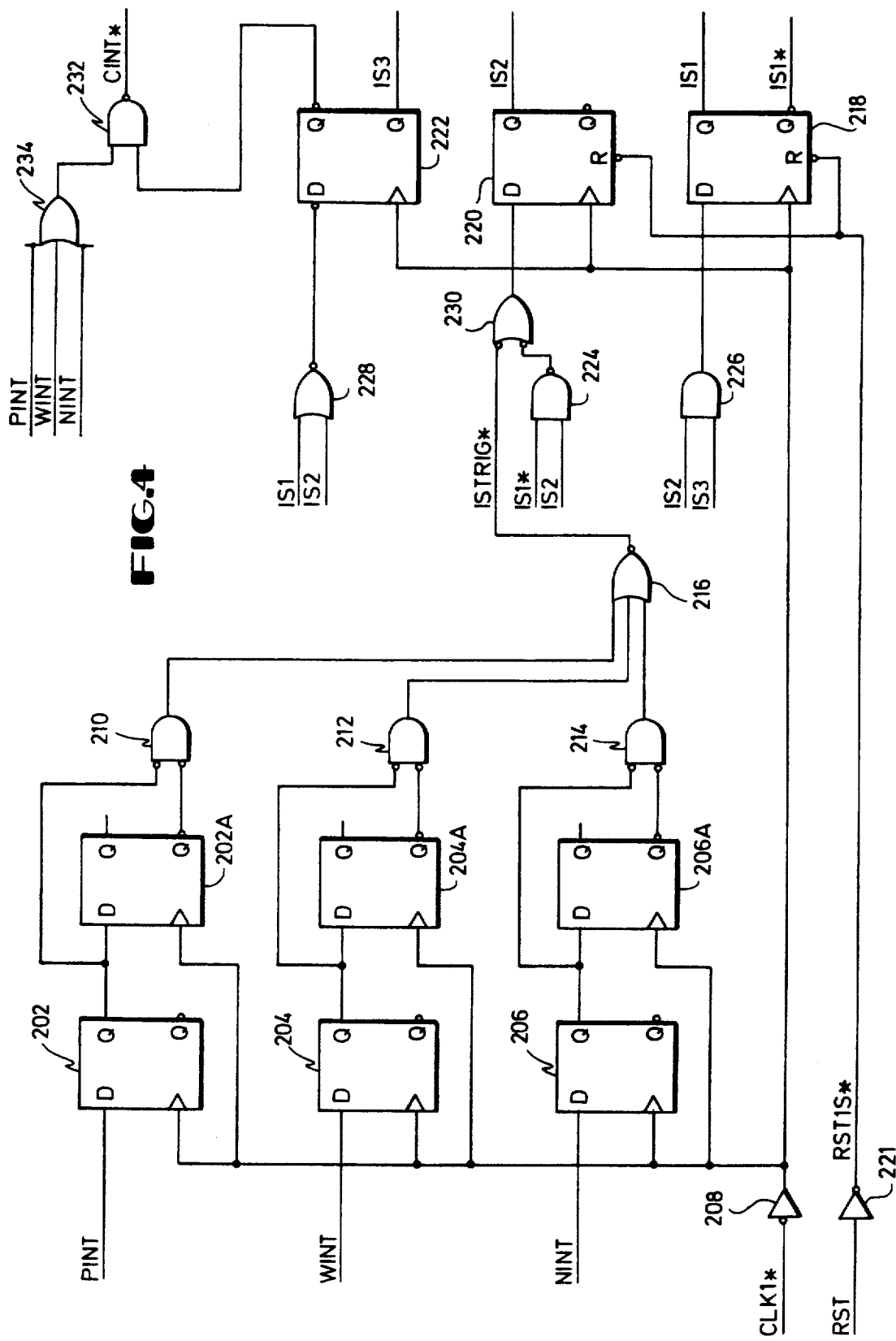
FIGS. 4 and 5 are digital logic circuit diagrams of portions of FIG. 3.

Turning now to the details of processor control logic circuit 49 (FIG. 4), a D-type flip-flop 202 receives at a D input a signal PINT indicative of the status of a interrupt signal from a programmable register addressable by processor 20 and processor 120. Similarly, D-type flip-flop 204 and 206 receive, respectively, signals WINT and NINT of the status of interrupt signals from the Weitek WTL 3167 and Intel 80387 portions of coprocessor 22, respectively. Flip-flops 202, 204 and 206 are each clocked by a common operating clock signal CLK1 from an inverter 208. The D inputs of D-type flip-flops 202A, 204A and 206A are connected to the Q-outputs of flip-flops 202, 204 and 206, respectively. Storage buffers 202A, 204A and 206A also receive the common operating clock signal CLK1.

A NOR gate 210 receives at one input the Q-output of the flip-flop 202 and at the other input the $\overline{Q}$ output of storage buffer 202A. In the event of the presence of the interrupt signal PINT from processor 20 at a high level, the Q output of flip-flop 202 is driven high in the next cycle of common operating clock signal CLK1, while the $\overline{Q}$ output of flip-flop 202A remains low. NOR gate 210 stays low until the PINT signal is removed. When the PINT signal is removed NOR gate 210 forms a high level pulse lasting one cycle of the common operating clock signal CLK1.

In a like manner, a NOR gate 212 is connected to the Q output of flip-flop 204 and $\overline{Q}$ output of flip-flop 204A to form a high level pulse lasting one cycle of common operating clock signal CLK1 when the WINT interrupt signal from the Weitek WTL 3167 portion of coprocessor 22 is removed. Similarly, a NOR gate 214 is connected to the Q output of flip-flop 206 and the $\overline{Q}$ output of flip-flop 206A to form a high level pulse lasting one cycle of common operating clock signal CLK1 in the event of the removal of an interrupt signal CINT from the Intel 80387 portion of coprocessor 22.

A NOR gate 216 is connected to receive the outputs from NOR gates 210, 212 and 214 and to form an interrupt trigger signal ISTRIG* in the event of receipt of a signal from any of the NOR gates 210, 212 or 214 in response to the removal of an interrupt signal.

Interrupt pulse D-type flip-flops 218 and 220 receive a system reset signal RSTIS* from an inverter 221 at their respective R inputs, at which time their $\overline{Q}$ outputs are driven high. Interrupt status flip-flops 218 and 220, as well as an interrupt status flip-flop 222 are all driven by the common operating clock signal CLK1 from the inverter 208. The $\overline{Q}$ output of interrupt status flip-flop 218 is an interrupt status signal IS1* which is furnished as an input to a NAND gate 224. The Q output of interrupt status flip-flop 220 is a signal IS2 which is furnished as an input to the NAND gate 224 and an AND gate 226. The Q output of interrupt status flip-flop 222 is an interrupt status signal IS3 which is an input to the NAND gate 226. A NOR gate 228 receives as its inputs interrupt status signal IS1 from the Q output of interrupt status flip-flop 218 and interrupt status signal IS2 from the Q output of interrupt status flip-flop 220.

When interrupt status flip-flop 218 and 220 receive the reset signal RSTIS* at their R inputs, the output of NAND gate 224 is high, permitting any interrupt trigger signal ISTRIG* received from NOR gate 216 to pass through a NAND gate 230 to a D input of the interrupt status flip-flop 220. The next clock pulse CLK1 transfers the interrupt signal ISTRIG* to the Q output of interrupt status flip-flop 220, causing the interrupt status signal IS2 to represent the status of the interrupt signal ISTRIG*. So long as interrupt status signals ISTRIG* remains high on each succeeding clock pulse CLK1, NOR gate 228 is maintained high. This maintains the $\overline{Q}$ output of interrupt status flip-flop 222 high and allows an interrupt output NAND gate 232 to pass any of the interrupt signals PINT from processor 20, WINT from the Weitek WTL 367 portion of coprocessor 22 and NINT from the Intel 80387 portion of coprocessor 22. These interrupt signals are received at an OR gate 234 and pass from interrupt output NAND gate 232 as an CINT* signal. The signal CINT* is inverted by an output buffer (not shown) of the processor control logic circuit 49, with the output signal representing the interrupt line IRQ13 which, as has been set forth above, is furnished from the processor control logic circuit 49 to the integrated system peripheral 54.

When, however, interrupt status signals ISTRIG* is driven low by a first removed interrupt signal from NOR gate 216, the interrupt status signal IS2 from interrupt status flip-flop 220 becomes high on the next clock pulse CLK1, inhibiting NAND gate 224 and NOR gate 228. This drives the output of NOR gate 228 low. This occurrence causes the $\overline{Q}$ output of interrupt status flip-flop 222 to go low, permitting NAND gate 230 to block any outstanding interrupt signal due to the others of PINT, WINT or CINT pending at the removal of the interrupt which triggered the state machine formed by flip-flops 218, 220 and 222 to advance. This results in the signal CINT*, representing the IRQ13 interrupt code, which is furnished to integrated system peripheral 54 pulsing high momentarily for a period which will be recognized. Thus the interrupt pulse flip-flops 218, 220 and 222 provide pulses to the CINT* signal whenever a PINT, WINT or NINT signal is removed and another of PINT, WINT or CINT is pending, thus allowing the system to detect multiple occurrences of the shared interrupt before all the interrupt request signals are cleared.

Figure 3:
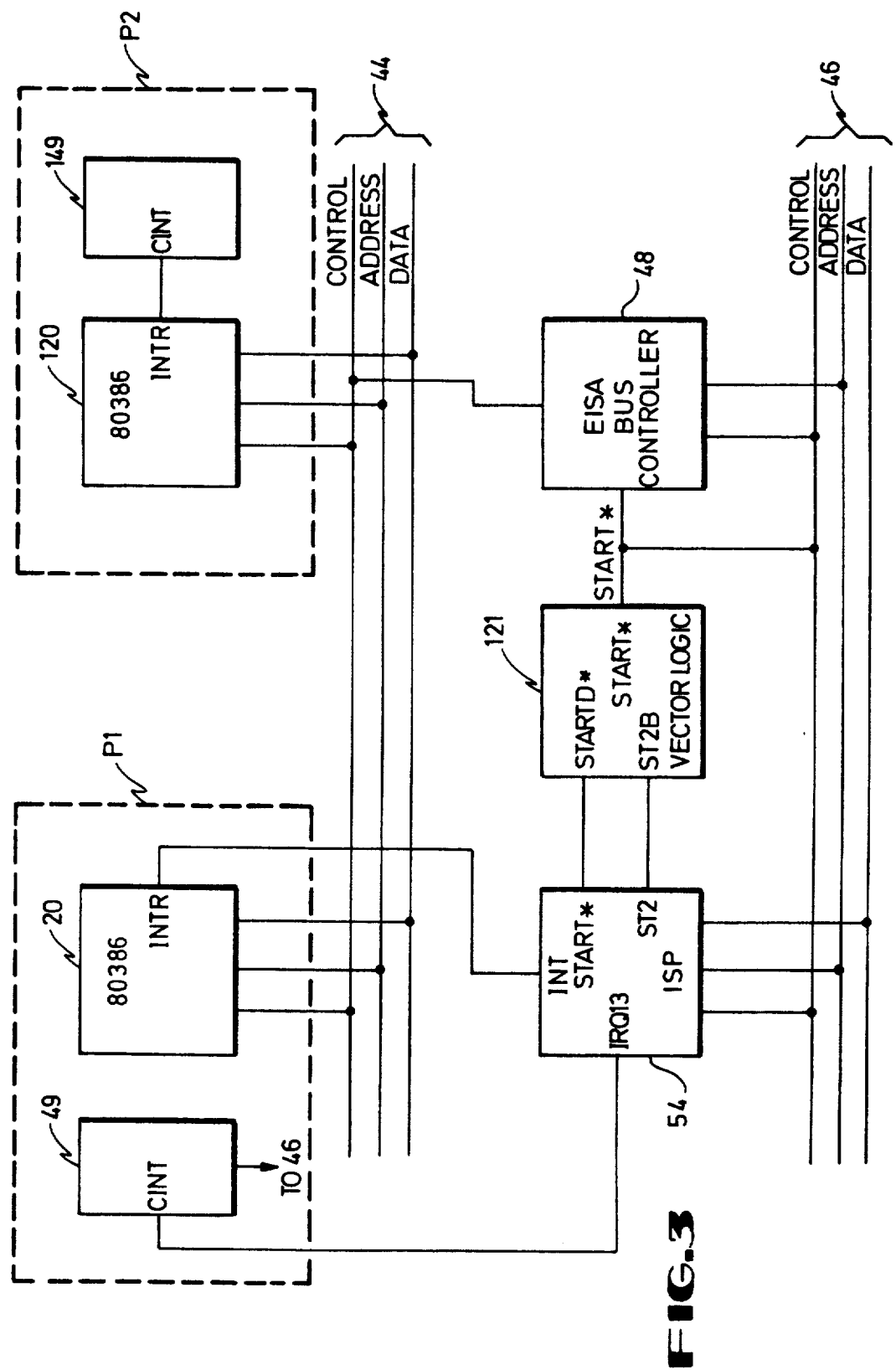
FIG. 3 is a schematic diagram of certain interacting components of the computer of FIGS. 1 and 2.

The processor control logic circuit 149 contains like circuit elements and operates in response to receipt of interrupt signals from processor 120 and coprocessor 122, reset signals and clock signals in a like manner as processor control logic circuit 49 operates in conjunction with processor 20 and coprocessor 22. Processor control logic circuit 149, however, provides the output signal CINT* from its gate 232 directly to the interrupt input INTR of processor 120 (FIG. 3), rather than as the interrupt line IRQ13 to integrated system peripheral 54 as is the case with processor control logic circuit 49.

Figure 5:
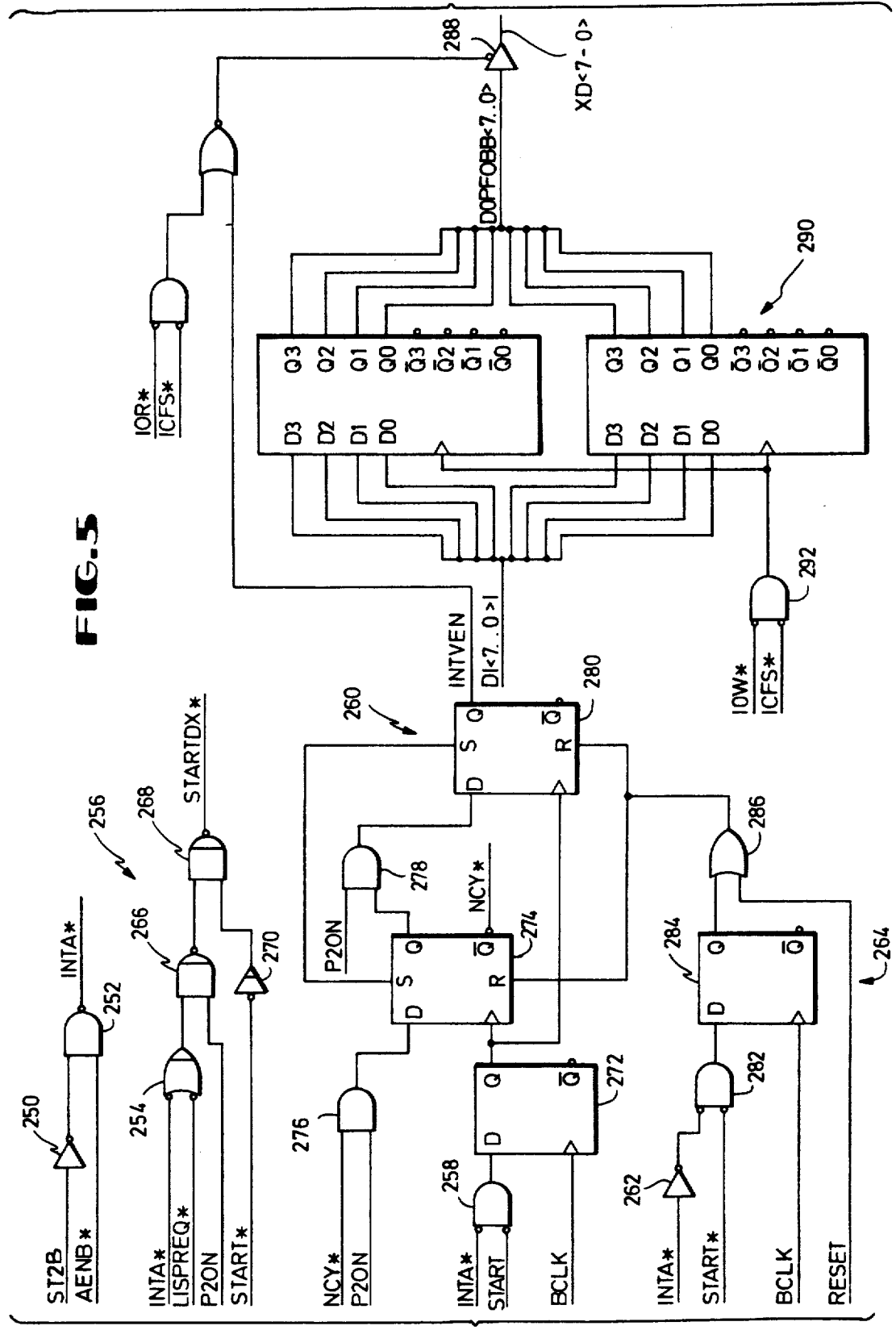

In the vector replacement logic circuit 121 (FIG. 5), an inverter 250 receives as an input signal ST2B representing status bit 2 from the integrated systems peripheral 54. Status bit 2 indicates that an interrupt acknowledge cycle is present. The output of inverter 250 is furnished as an input to an NAND gate 252 which also receives as an input an address enable signal AENB*, which is used to qualify the ST2B signal. When the AENB* signal is low, a direct memory access cycle is in progress and the ST2B signal has a different function.

NAND gate 252 forms an interrupt acknowledge signal INTA* on receipt of status bit 2 from integrated systems peripheral 54. The interrupt acknowledge signal INTA* is provided as an input to an NAND gate 254 of a block start circuit 256, a NOR gate 258 of an interrupt mask logic circuit 260 and an inverter 262 of a reset circuit 264.

In the block start logic circuit 256, the NAND gate 254 receives the signal INTA* as well as a signal LIS- PREG which indicates, when low, that the processor 120 is trying to access the interrupt controller contained in the integrated system peripheral 54. The output from NAND gate 254 is high during the active presence of the signals INTA* or LISPREG* and is furnished to a NAND gate 266. NAND gate 266 receives as a second input a signal P2ON from the arbitration logic 77 indicating that the processor 120 is operating on the bus 44. If this is the case, the output of NAND gate 266 is driven low. The output of the NAND gate 266 is furnished as a first input to a block start NAND gate 268. The NAND gate 268 also receives from an inverter 270 the START signal, the EISA bus cycle signal signifying the start of the next EISA bus cycle.

When the interrupt acknowledge signal INTA* is present at the output of NAND gate 252, the output of NAND gate 266 is driven low, inhibiting the signal START from passing through the block start NAND gate 268 and accordingly preventing the signal STARTDX* from passing to the integrated system peripheral 54. In this manner, when the second processor 120 is on the bus and a maskable interrupt signal is received, the start of the next bus cycle is inhibited or hidden from the integrated system peripheral 54, thus keeping the integrated system peripheral 54 from placing an interrupt vector on the bus. When the INTA* or LISPREG* signal are not present the START* signal is passed through the block start logic circuit 256 to the integrated system peripheral 54.

In the interrupt mask logic circuit 260, the NOR gate 258 receives the start signal START* as well as the interrupt acknowledge system INTA*. The status of NOR gate 258 is read into a D-type flip-flop 272 by a clock signal BCLK provided on the EISA bus 46 so that the Q output furnished as a clock signal to a D-type flip-flop 274 represents the presence of both a start signal and an interrupt acknowledge signal.

An AND gate 276 receives as a first input a no cycle signal NCY* from the $\bar{Q}$ output of flip-flop 274 and as a second input the signal P20N indicating that processor 120 is operating on the bus. The output of AND gate 276 is provided to the D input of flip-flop 274. The signal P20N is also furnished as an input to an AND gate 278. Gate 278 also receives as an input the Q output of flip-flop 274. The output of gate 278 is furnished as a D input to a D-type flip-flop 280 which receives as its clock signal the Q output of flip-flop 272.

An interrupt acknowledge cycle is two EISA read cycles in length. As a result the START* signal is pulsed low two times during the interrupt acknowledge cycle. The interrupt vector must be provided on the second read cycle, the second pulse of the START* signal. This is in accordance with the timing requirements of the preferred 80386 microprocessor.

When the INTA* signal is active, on the next rising edge of the BCLK signal during a START* signal pulse the Q output of flip-flop 274 goes high. The signal at the D input of flip-flop 280 remains low. The START* signal goes high and on the next rising edge of the BCLK signal the Q output of flip-flop 272 goes low. On the second START* signal pulse in the interrupt acknowledge cycle the Q output of flip-flop 272 again goes high. This clocks the high signal present at the D input of flip-flop 280 into flip-flop 280, with the Q output, the INTVEN or interrupt vector enable signal, going high. The INTVEN signal is coupled to the tri-state control input of a buffer 288 which provides the output of an 8 bit second processor interrupt vector register 290 to the XD data bus, so that the vector is provided to processor 120.

The second processor interrupt vector register 290 can be loaded by processor 20 by performing an I/O write operation to I/O port address FC68h in the preferred embodiment. The D inputs of the register 290 are connected to the XD data bus lines <7-0>, while the clocking input is connected to NOR gate 292. NOR gate 292 receives signals indicating that an I/O port write operation is occurring, IOW*, and address FC68h is present, ICFS*.

Flip-flops 274 and 280 of the interrupt mask logic circuit 260 have their respective S inputs, connected to a logic low level. Flip-flops 274 and 280 of interrupt mask logic circuit 260 receive reset signals at their R input terminals from the reset circuit 264. The inverted interrupt acknowledge signal INTA* output of inverter 262 is furnished as a first input to a NOR gate 282 which also receives as a second input the start signal START*. The output of the gate 282 is driven high on the next start signal START* after the interrupt acknowledge signal INTA* is removed, which passes through a D-type flip-flop 284 on the next rising edge of the BCLK signal received at its clock input. The Q output of flip-flop 284 is driven high at this time, which passes through an OR gate 286 as a reset signal to the R inputs of the shift registers 274 and 280. Alternatively, a system reset signal may be received as the other input to the OR gate 286 and furnished as a reset signal to the R outputs of flip-flop 274 and 280. Thus the flip-flops 274 and 280 are kept reset until an interrupt acknowledge cycle is pending.

Accordingly, it can be seen that in the computer C according to the present invention, two independently operating processors 20 and 120 share common control, data and address buses. The processor 20 is assigned when it is on the buses to respond to all maskable interrupts by causing placement of the interrupt vector on the bus at the start of the next bus cycle by means of the process control logic circuit 49. Alternatively, when the second processor 120 is on the bus and a maskable interrupt is received, the start of the next bus cycle is inhibited by the vector replacement logic circuit 121 preventing an interrupt vector from being placed on the bus.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. An interrupt control system for a multiprocessor computer system including a first and a second processor operating asymmetrically with respect to each other, each processor sharing a bus and performing an interrupt acknowledge cycle on the bus in response to a processor interrupt signal received by the processor, the computer system further including means for generating interrupt signals intended for the first processor and means for generating an interrupt signal intended for the second processor and providing the processor interrupt signal to the second processor, the interrupt control system comprising:

means for coupling to the bus for receiving the interrupt signals intended for the first processor and for providing a processor interrupt signal to the first processor means for coupling to the bus for placing; an interrupt vector on the bus when an interrupt acknowledge cycle is performed on the bus;

means for coupling to the bus for determining if the second processor is controlling the bus;

means coupled to said interrupt vector placing means and said second processor bus control determining means and for coupling to the bus for inhibiting said interrupt vector placing means from placing said interrupt vector on the bus if the second processor is controlling the bus when an interrupt acknowledge cycle is performed on the bus; and vector replacement logic means coupled to said means for inhibiting and said second processor bus control determining means and for coupling to the bus for providing a replacement interrupt vector for the second processor when said means for inhibiting inhibits said interrupt vector placing means.

2. The interrupt control system of claim 1, wherein said interrupt receiving means includes an integrated system peripheral receiving the interrupt signals intended for the first processor, masking selected ones of said received interrupt signals and providing processor interrupt signal to the first processor for each unmasked received interrupt signal.

3. The interrupt control system of claim 2, wherein said integrated system peripheral further includes said vector placing means, wherein said integrated system peripheral monitors cycles appearing on the bus when said interrupt receiving means is coupled to the bus, said integrated system peripheral detecting the start of each bus cycle and determining if an interrupt acknowledge cycle is being performed and placing an interrupt vector on the bus at the proper time after the start of the next bus cycle in response to said interrupt acknowledge cycle determination.

4. The interrupt control system of claim 3, wherein said means for inhibiting inhibits said integrated system peripheral from detecting the start of the next bus cycle following an interrupt acknowledge cycle determination by said integrated system peripheral when the second process is controlling the bus.

5. The interrupt control system of claim 4, wherein said vector replacement logic means monitors said means for inhibiting and provides said replacement interrupt vector at the proper time in the cycle during which said means for inhibiting is inhibiting said integrated system peripheral.

6. The interrupt control system of claim 1, wherein said vector replacement logic means includes means for receiving a replacement vector value from a processor over the bus.

* * * * *

UNITED STATES PATENT AND TRADEMARK OFFICE
CERTIFICATE OF CORRECTION

PATENT NO.   :   5,247,685

DATED        :   September 21, 1993

INVENTOR(S)  :   John A. Landry, et al.

It is certified that error appears in the above-identified patent and that said Letters Patent is hereby corrected as shown below:

In column 9, line 1, after the word "processor" please insert --;--.

In column 9, line 2, after "ing" please delete ";".

In column 9, line 26, after "providing" please insert --a--.

In column 10, line 17, please replace "process" with --processor--.

Signed and Sealed this

Twenty-ninth Day of March, 1994

Attest:

BRUCE LEHMAN

*Attesting Officer*    *Commissioner of Patents and Trademarks*